(12) United States Patent
Ungati et al.

(10) Patent No.: US 10,644,937 B2
(45) Date of Patent: May 5, 2020

(54) TECHNIQUES FOR MANAGING SCIM-COMPLIANT SYSTEMS

(71) Applicant: Oracle International Corporation, Redwood Shores, CA (US)

(72) Inventors: Jagan Mohan Ungati, Srikakulam (IN); Sourav Panda, Bhubaneswar (IN); Shahabas Salam, Palakkad (IN); Basavaraj Hungund, Bangalore (IN); Atul Goyal, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 431 days.

(21) Appl. No.: 15/702,448

(22) Filed: Sep. 12, 2017

(65) Prior Publication Data

US 2018/0077015 A1    Mar. 15, 2018

(30) Foreign Application Priority Data

Sep. 13, 2016 (IN) .............................. 201641031159

(51) Int. Cl.
*H04L 29/06* (2006.01)
*H04L 12/24* (2006.01)

(52) U.S. Cl.
CPC .......... *H04L 41/0809* (2013.01); *H04L 41/20* (2013.01); *H04L 41/5054* (2013.01); *H04L 41/0886* (2013.01); *H04L 63/08* (2013.01)

(58) Field of Classification Search
CPC . H04L 41/0809; H04L 41/5054; H04L 41/20; H04L 41/0886; H04L 63/08
See application file for complete search history.

(56) References Cited

U.S. PATENT DOCUMENTS

| | | | |
|---|---|---|---|
| 9,781,122 B1* | 10/2017 | Wilson | H04L 63/101 |
| 2007/0260750 A1* | 11/2007 | Feied | H04L 67/06 709/246 |
| 2014/0245389 A1* | 8/2014 | Oberheide | H04L 63/0815 726/3 |
| 2016/0182314 A1* | 6/2016 | Will | H04L 63/102 709/226 |
| 2016/0267170 A1* | 9/2016 | Hastings | H04L 67/10 |
| 2016/0330177 A1* | 11/2016 | Singleton, IV | H04L 9/0827 |
| 2017/0329957 A1* | 11/2017 | Vepa | G06F 21/445 |
| 2017/0331812 A1* | 11/2017 | Lander | H04L 63/0815 |
| 2017/0331829 A1* | 11/2017 | Lander | G06F 21/6218 |
| 2018/0041467 A1* | 2/2018 | Vats | H04L 61/1523 |
| 2018/0041515 A1* | 2/2018 | Gupta | H04L 63/102 |
| 2018/0075231 A1* | 3/2018 | Subramanian | G06F 21/41 |
| 2018/0077144 A1* | 3/2018 | Gangawane | H04L 63/0815 |

* cited by examiner

*Primary Examiner* — Philip J Chea
*Assistant Examiner* — Wuji Chen
(74) *Attorney, Agent, or Firm* — Kilpatrick Townsend & Stockton LLP

(57) ABSTRACT

The present disclosure describes techniques for using instances of a connector to communicate with multiple target systems without a manual pre-configuration step for each of the multiple target systems. The connector may be an extensible program-code-template for creating objects to perform one or more operations. For example, each instance of the connector may obtain information regarding a corresponding target system, determine an interface to the corresponding target system based on the information, and translate requests for the corresponding target system according to the interface.

17 Claims, 10 Drawing Sheets

TECHNIQUES FOR MANAGING SCIM-COMPLIANT SYSTEMS

CROSS-REFERENCES TO RELATED APPLICATIONS

This application claims the benefit of and priority to Indian Provisional Patent Number 201641031159, filed on Sep. 13, 2016, entitled "INFRASTRUCTURE FOR SCIM COMPLIANT APPLICATIONS," the entire contents of which is hereby incorporated by reference for all purposes.

BACKGROUND

A management system (e.g., an identity management system) is typically used to manage accounts (e.g., users, groups, roles, entitlements, permissions, devices, or any real-world physical or non-physical entity that may be modeled as an account) for various remote systems. For example, a management system may facilitate provisioning (e.g., creating or activating), deprovisioning (e.g., deactivating or deleting), modifying accounts associated with various remote systems, or the like. However, management systems have traditionally been individually preconfigured by an administrator to interface with each of the various remote systems. And as the number of remote systems increases, preconfiguring management systems to interface with each of the remote systems becomes onerous due to, for example, scalability issues, code duplicity, excessive setup costs, and excessive management costs.

SUMMARY

The present disclosure describes techniques for connecting a management system to multiple target systems without a manual pre-configuration step for each of the multiple target systems (sometimes referred to as automatic discovery or plug-and-play). In particular, the management system may connect to each of the multiple target systems using an instance of a connector (e.g., an extensible program-code template for creating objects to perform one or more operations). Each instance of the connector may obtain (sometimes referred to as discover) information regarding a corresponding target system, determine an interface for the corresponding target system based on the information, and translate requests for the corresponding target system based on the interface. In some embodiments, the discovery of the information may be performed automatically in response to an identification of a target system.

Various inventive embodiments are described herein, including methods, systems, non-transitory computer-readable storage media storing programs, code, or instructions executable by one or more processors, and the like. For example, a method may begin when a request to initialize a connector for each of multiple target systems is received by a management system.

In response to the request to initialize the connector, the management system may initialize an instance of the connector, which may perform the following steps for each of the target systems: connect to the target system, authenticate with the target system (either utilizing a generic authentication procedure used by many target system or a custom authentication procedure that is particular to the target system), obtain information regarding the target system, and store the obtained information, where each of the multiple target systems has a different instance of the connector. In some embodiments, each of the plurality of target systems are System for Cross Domain Identity Management (SCIM) compliant or a customization of SCIM. In some embodiments, the information regarding the target system is a schema of the target system. Obtaining the information may include using a System for Cross Domain Identity Management (SCIM) application program interface (API) or a customized System for Cross Domain Identity Management (SCIM) application program interface (API). The request to initiate the connector for each of a plurality of target systems may be the same request as the first request. The obtained information may be stored in a schema data structure. Authenticating the instance may be based on a custom authentication process associated with the target system.

The method may further include the management system receiving a first request to perform an operation on each of the target systems. The operation may be associated with modifying or querying an account on a target system. In response to the first request, the management system may identify a particular instance of the connector that corresponds to the target system. The particular instance of the connector may then generate (or create) a second request to perform the operation on the target system. In some embodiments, the second request may be generated based on the discovered information. In such embodiments, the second request may correspond to the first request, where the second request is consumable by the target system and the first request is not consumable by the target system. The particular instance of the connector may then send the second request to the target system. In some embodiments, the second request to a first target system of the plurality of target systems is in a different format than the second request to a second target system of the plurality of target systems. A payload of the second request may not be SCIM compliant; however, a payload of a request for a different operation than the operation on the target system may be SCIM compliant. In some embodiments, the second request may be sent to a URI specified for the target system for the operation, where the URI is different than a URI specified for the operation by SCIM. In some embodiments, the second request may be sent using a HTTP Operation different than is specified by SCIM.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION OF THE INVENTION

Figure 1:
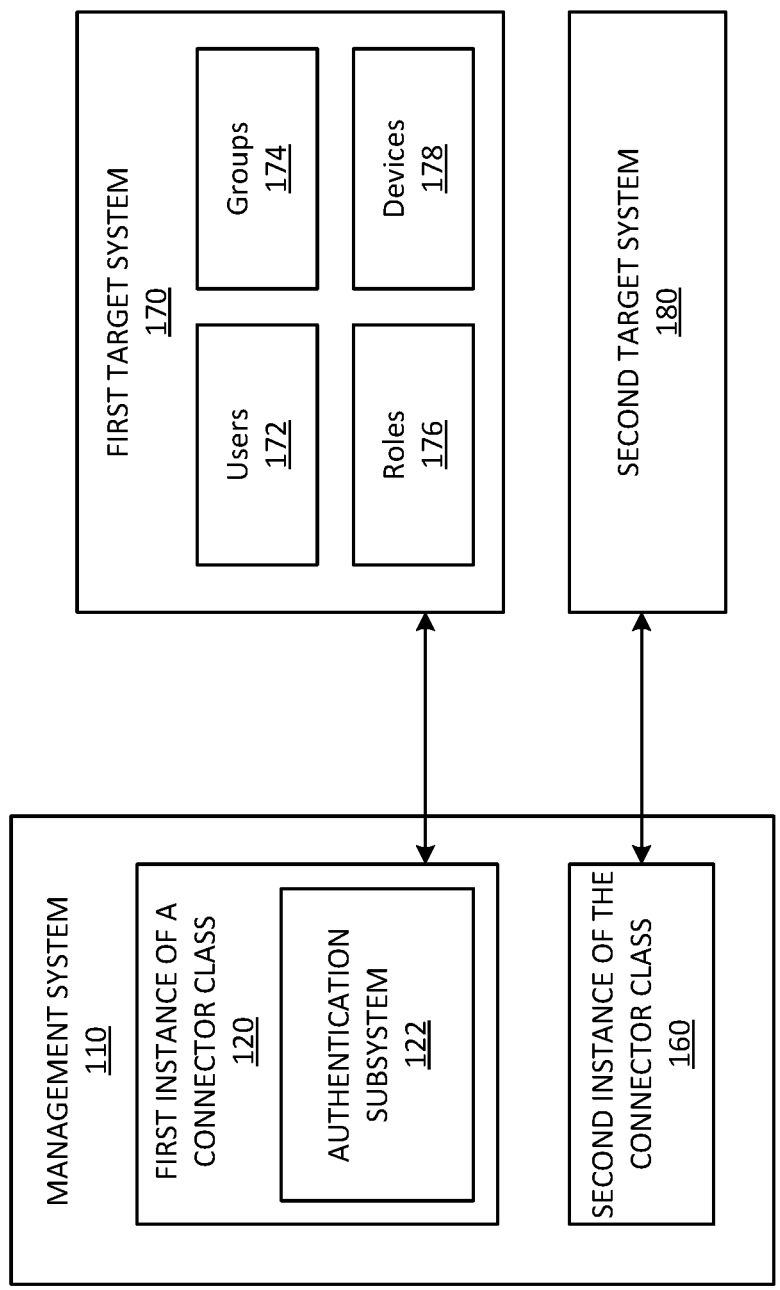
FIG. 1 illustrates an example of instances of a connector communicating with multiple target systems.

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

According to certain embodiments, the present disclosure describes techniques for connecting a management system to multiple target systems without a manual pre-configuration step for each of the multiple target systems (sometimes referred to as automatic discovery or plug-and-play). In particular, the management system may connect to each of the multiple target systems using an instance of a connector (e.g., an extensible program-code template for creating objects to perform one or more operations). After connecting with a target system, an instance of the connector may authenticate with the target system using either utilizing a generic authentication procedure used by many target system (e.g., OAuth 2.0 or HTTP Basic Authentication) as described below with reference to FIG. 3 or a custom authentication procedure that is particular to the target system as described below with reference to FIG. 7. Each instance of the connector may discover information regarding a corresponding target system, determine an interface for the corresponding target system based on the information, and translate requests for the corresponding target system based on the interface.

In some embodiments, techniques described above may be separated into two phases: an information discovery phase and a request processing phase. The information discovery phase may identify one or more target systems. Each of the one or more target systems may provide one or more services for an account of the target system. In addition, each of the one or more target systems may include an application program interface (API) for communicating with the target system. The API may be based on a standard in the industry, such as System for Cross-Domain Identity Management (SCIM). SCIM has defined a core schema for Users, Groups, etc. SCIM also gives the flexibility to extend the core schema and add additional objects or attributes (sometimes referred to as SCIM++). For example, additional fields to User schema may be added or even new objects like Devices. And because schemas are auto discovered, techniques described herein may support SCIM++.

Using the API, an instance of a connector may discover a schema for a target system by requesting the schema. The schema may describe a structure of the target system such that the instance of the connector may determine how to interface with the target system using the schema. The instance of the connector may then store the schema or information associated with the schema in a schema data structure. The information associated with the schema may include object names, group names, parameters for the object names, parameters for the group names, relations between objects and/or group, or the like.

After a schema is discovered for a target system, a schema data structure may be generated to represent the target system. The schema data structure may include information regarding: one or more objects supported by the target system: one or more attributes and their properties for an object supported by the target system, one or more operations supported for an object supported by the target system, the like, or any combination thereof. In addition, the schema data structure may indicate whether an attribute is mandatory, a number of values defined for an attribute, one or more data types for an attribute, whether an object is a part of another object (embedded object), whether an object is updateable or read only, or the like. A sample schema data structure is provided below:

```
<Schema>
  <ObjectClassInfos>
    <ObjectClassInfo type='Group.members' container='false' embedded='true'>
      <AttributeInfos>
        <AttributeInfo name='display' type='String'/>
        <AttributeInfo name='name' type='String'>
          <AttributeInfoFlag value='REQUIRED'/>
        </AttributeInfo>
        <AttributeInfo name='value' type='String'>
          <AttributeInfoFlag value='REQUIRED'/>
        </AttributeInfo>
        <AttributeInfo name='type' type='String'/>
        <AttributeInfo name='$ref' type='String'/>
        <AttributeInfo name='name' type='String'/>
      </AttributeInfos>
    </ObjectClassInfo>
    <ObjectClassInfo type='User.roles' container='false' embedded='true'>
      ...
      ...
    </ObjectClassInfo>
    <ObjectClassInfo type='User.phoneNumbers' container='false' embedded='true'>
      ...
      ...
    </ObjectClassInfo>
    <ObjectClassInfo type='User.devices' container='false' embedded='true'>
      ...
      ...
    </ObjectClassInfo>
    <ObjectClassInfo type='User.groups' container='false' embedded='true'>
      ...
      ...
    </ObjectClassInfo>
    <ObjectClassInfo type='User.entitlements' container='false' embedded='true'>
      ...
      ...
    </ObjectClassInfo>
    <ObjectClassInfo type='User.addresses' container='false' embedded='true'>
      ...
      ...
    </ObjectClassInfo>
    <ObjectClassInfo type='User' container='false' embedded='false'>
      <AttributeInfos>
        <AttributeInfo name='name.givenName' type='String'/>
        <AttributeInfo name='name.middleName' type='String'/>
        <AttributeInfo name='name.familyName' type='String'/>
          <AttributeInfoFlag value='REQUIRED'/>
        </AttributeInfo>
        <AttributeInfo name='name' type='String'>
          <AttributeInfoFlag value='REQUIRED'/>
        </AttributeInfo>
        <AttributeInfo name='name.honorificPrefix' type='String'/>
        <AttributeInfo name='locale' type='String'/>
        <AttributeInfo name='name.honorificSuffix' type='String'/>
        <AttributeInfo name='status' type='String'/>
        <AttributeInfo name='displayName' type='String'/>
        <AttributeInfo name='expired' type='Boolean'/>
        <AttributeInfo name='name.formatted' type='String/'>
        <AttributeInfo name='User.emails' type='EmbeddedObject'
          objectClassName='User.emails'>
          <AttributeInfoFlag value='MULTIVALUED'/>
        </AttributeInfo>
        <AttributeInfo name='User.addresses' type='EmbeddedObject'
```

```
objectClassName='User addresses'>
          <AttributeInfoFlag value='MULTIVALUED'/>
        </AttributeInfo>
        <AttributeInfo name='User.groups' type='EmbeddedObject'
objectClassName='User.groups'>
          <AttributeInfoFlag value='MULTIVALUED'/>
        </AttributeInfo>
        <AttributeInfo name='User.phoneNumbers' type='EmbeddedObject'
objectClassName='User.phoneNumbers'>
          <AttributeInfoFlag value='MULTIVALUED'/>
        </AttributeInfo>
        <AttributeInfo name='User.devices' type='EmbeddedObject'
objectClassName='User.devices'>
          <AttributeInfoFlag value='MULTIVALUED'/>
        </AttributeInfo>
        <AttributeInfo name='User.entitlements' type='EmbeddedObject'
objectClassName='User.entitlements'>
          <AttributeInfoFlag value='MULTIVALUED'/>
        </AttributeInfo>
        <AttributeInfo name='User.roles' type='EmbeddedObject'
objectClassName='User.roles'>
          <AttributeInfoFlag value='MULTIVALUED'/>
        </AttributeInfo>
        <AttributeInfo name='User.photos' type='EmbeddedObject'
objectClassName='User.photos'>
          <AttributeInfoFlag value='MULTIVALUED'/>
        </AttributeInfo>
        <AttributeInfo name='User.secQuestions' type='EmbeddedObject'
objectClassName='User.secQuestions'>
          <AttributeInfoFlag value='MULTIVALUED'/>
        </AttributeInfo>
        ...
        ...
      </AttributeInfos>
    </ObjectClassInfo>
    <ObjectClassInfo type='Group' container='false' embedded='false'>
      <AttributeInfos>
        <AttributeInfo name='Group.owners' type='EmbeddedObject'
objectClassName='Group.owners'>
          <AttributeInfoFlag value='MULTIVALUED'/>
        </AttributeInfo>
        <AttributeInfo name='Group.members' type='EmbeddedObject'
objectClassName='Group.members'>
          <AttributeInfoFlag value='MULTIVALUED'/>
        </AttributeInfo>
        <AttributeInfo name='Group.grants' type='EmbeddedObject'
objectClassName='Group.grants'>
          <AttributeInfoFlag value='MULTIVALUED'/>
        </AttributeInfo>
        <AttributeInfo name='Group.appRoles' type='EmbeddedObject'
objectClassName='Group.appRoles'>
          <AttributeInfoFlag value='MULTIVALUED'/>
        </AttributeInfo>
        ...
        ...
      </AttributeInfos>
    </ObjectClassInfo>
    ...
    ...
  </ObjectClassInfos>
  <OperationOptionInfos/>
  <objectClassesByOperation>
    <Map>
      <MapEntry>
        <Class>SchemaApiOp</Class>
        <Set>
          <String>Group</String>
          <String>User</String>
        </Set>
      </MapEntry>
      <MapEntry>
        <Class>CreateApiOp</Class>
        <Set>
          <String>Group</String>
          <String>User</String>
        </Set>
      </MapEntry>
      <MapEntry>
        <Class>UpdateApiOp</Class>
```

```
        <Set>
            <String>Group</String>
            <String>User</String>
        </Set>
    </MapEntry>
    <MapEntry>
        <Class>DeleteApiOp</Class>
        <Set>
            <String>Group</String>
            <String>User</String>
        </Set>
    </MapEntry>
    <MapEntry>
        <Class>SearchApiOp</Class>
        <Set>
            <String>Group</String>
            <String>User</String>
        </Set>
    </MapEntry>
    </Map>
 </objectClassesByOperation>
</Schema>
```

The request processing phase may occur after the information discovery phase. The request processing phase may include receiving a first request for an operation associated with a target system. The management system may identify an instance of the connector corresponding to the target system, where the instance includes a schema or information associated with the schema for the target system. The instance may then generate a second request or modify the first request into the second request, where the second request is formatted according to the schema for the target system. The second request may be sent to the target system to be processed by the target system.

In one illustrative example, an employee may join an enterprise. The enterprise may want to establish an account for the employee on multiple target systems. For example, the employee may want an entry in a human resource system, an email account in an email system, a storage location in a storage system, an account on a third party system, or the like. Rather than an administrator (or the employee) individually creating accounts on each of the multiple target systems, instances of a connector may be configured to interface with the multiple target systems based on information discovered from the multiple target systems during an information discovery phase.

In some embodiments, the information discovery phase may occur in response to a request for an interaction with a target system. For example, a request may be received indicating that (1) a user needs accounts in each of the multiple target systems, (2) a user wants to change her password, (3) a user wants to update her profile information, (4) an enterprise wishes to sync accounts from their native applications to the management application, (5) an enterprise wishes to delete an account, (6) or the like. In other embodiments, the enterprise may identify the multiple target systems before a request for an interaction with a target system. In such examples, the multiple target systems may be indicated as systems that the enterprise uses or wishes to use. Before the information discovery phase, the management system may have limited information regarding the multiple target systems. For example, an interface to perform one or more services provided by each of the multiple target systems may be unknown to the management system before the information discovery phase.

The management system may send requests for a schema to each of the multiple target systems. Each schema may indicate how the management system should interface with each of the multiple target systems.

Then, when the accounts for the employees need to be created, the management system may generate requests to create accounts on each of the multiple target systems using instances of a standard interface class (sometimes referred to as a connector). In particular, an instance of the connector may be created on the management system for each target system of the multiple target systems. Each instance may include a schema associated with a corresponding target system. Using the schema, an instance of the connector may generate a request for creating an account that is consumable by a corresponding target system. In some embodiments, a single request may be received by the management system for an employee, where the single request causes a different request to be sent by different instances of the connector to each of the multiple target systems.

FIG. 1 illustrates an example of instances of a connector communicating with multiple target systems. The instances include first instance 120 and second instance 160. The multiple target systems include first target system 170 and second target system 180 While two instances and two target systems are illustrated, it should be recognized that more or less of each may be included. In addition, more or less connectors may be also included, where a connector is an extensible program-code template for creating objects, providing initial values for a state (member variables), and providing implementations for behavior (member functions or methods).

The instances 120, 160 may be included in management system 110. Management system 110 may be separate from first target system 170 and/or second target system 180. In addition, first target system 170 may be separate from second target system 180.

Management system 110 may communicate with an enterprise (not illustrated). The enterprise may include one or more computer systems that are associated with an entity. The enterprise may use management system 110 to manage and coordinate accounts on target systems 170, 180. Examples of accounts that may be managed include users 172, groups 174, roles 176, entitlements, permissions, devices 178, or any real-world physical or non-physical entity that may be modeled as an account. While the accounts are illustrated as included in first target system 170, it should be recognized that the accounts may be stored remote from first target system 170. In addition, it should be recognized that first target system 170 and/or second target system 180 may include more or less accounts than illustrated in FIG. 1.

Management system 110 may be configured to process requests received from a device included in the enterprise, where the requests are associated with accounts of the target systems 170, 180. Examples of requests include a request to initiate a connector with one or more target systems and a request to perform one or more operations associated with a target system (e.g., modify or access the target system).

In one illustrative example, management system 110 may receive a request to initiate a connector for each of the target systems 170, 180. In response to the request to initiate the connectors, a first instance of the connector (e.g., first instance 120) and a second instance of the connector (e.g., second instance 160) may be initiated. First instance 120 may correspond to (and communicate with) first target system 170, and second instance 160 may correspond to (and communicate with) second target system 180.

When initiated, instances 120, 160 may not include any target-system specific information. Instead, the instances 120, 160 may only include logic to communicate with a SCIM-compliant (or SCIM++-compliant) target system for connecting and discovering information regarding the SCIM-compliant (or SCIM++-compliant) target system. For example, the instances 120, 160 may each include an authentication subsystem (e.g., authentication subsystem 122 of first instance 120).

Authentication subsystem 122 may be used to authenticate first instance 120 with first target system 170. The types of authentication supported by authentication subsystem 122 may be limited to particular authentications in a Representational State Transfer (REST) common library (as further described below for FIG. 3). Other embodiments described herein (e.g., in FIG. 7) allow other types of authentications to be used.

An example of an authentication technique that would be supported by authentication subsystem 122 is HTTP Basic Authentication. For HTTP Basic Authentication, first instance 120 may receive a user-id and a password. First instance 120 may construct a user password by concatenating the user-id, a single colon (":"), and the password. This constructed user password is then base64 encoded to form the authentication header for use with first target system 170. For example, if the user-id "Aladdin" and password "open sesame" are used, the following header would be used in subsequent target calls: "Authentication: Basic QWxhZGRpbjpvcGVuIHNlc2FtZQ==".

Another example of an authentication technique that would be supported by authentication subsystem 122 is OAuth2.0 Client Credentials. For OAuth2.0 Client Credentials, first instance 120 may receive a client id and a client secret. First instance 120 may then contact an authentication end point of first target system 170, the end point configured in "authenticationUrl" config parameter with the below payload:

```
POST /token HTTP/1.1
Host: server.example.com
Content-Type: application/x-www-form-urlencoded
grant_type=client_credentials&client_id=s6BhdRkqt3&
client_secret=7Fjfp0ZBr1KtDRbnfVdmIw
```

In response to sending the above payload, first instance 120 may receive an access token in a successful response, as recited in the example below:

```
HTTP/1.1 200 OK
Content-Type: application/json;charset=UTF-8
Cache-Control: no-store
Pragma: no-cache
{
  "access_token": "2YotnFZFEjr1zCsicMWpAA",
  "token_type": "example",
  "expires_in":3600,
  "refresh_token": "tGzv3JOkF0XG5Qx2TlKWIA",
  "example_parameter":"example_value"
}
```

One illustrative example of an access token, which may be used in a header for subsequent calls to first target system 170, is: "Authentication: Bearer 2YotnFZFEjr1zCsicMWpAA."

Figure 2:
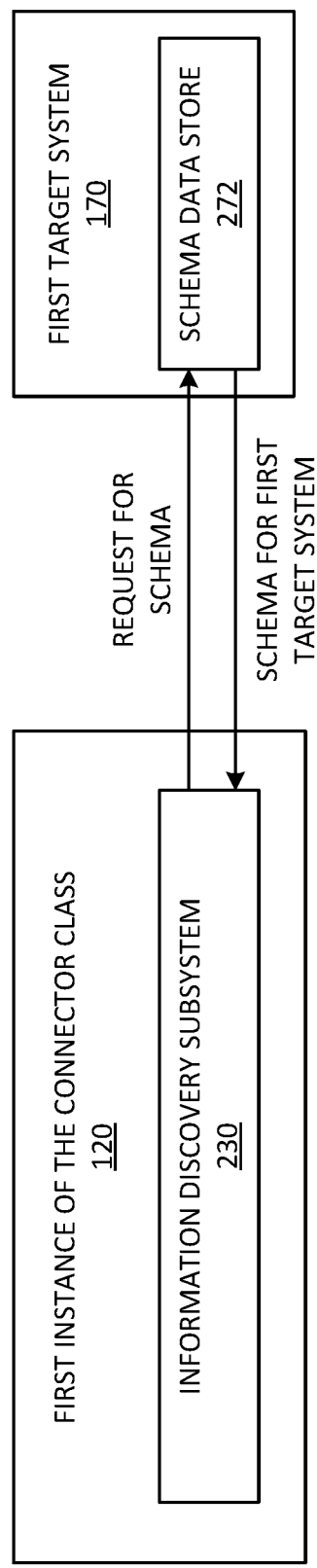
FIG. 2 illustrates an example of a first instance of a connector discovering a schema from a first target system.

FIG. 2 illustrates an example of first instance 120 discovering a schema from first target system 170. The schema of first target system 170 may be originally stored in schema data store 272 of first target system 170. However, it should be recognized that the schema may be stored remotely from first target system 170.

First instance 120 may discover the schema after first instance 120 has been authenticated with first target system 170. For discovering the schema, first instance 120 may include information discovery subsystem 230. Information discovery subsystem 230 may be configured to send a request to first target system 170 to retrieve the schema. The schema may define a structure of first target system 170. The schema may also, or in the alternative, define one or more locations (e.g., URLs) of first target system 170 where communications are to be sent. The schema may also, or in the alternative, define a format for communications destined for first target system 170.

In response to receiving the request for the schema, first target system 170 may send the schema to first instance 120. Then, first instance 120 may generate a schema data structure to be stored by first instance 120. The schema data structure may include information from the schema received from first target system 170. The information may be used by first instance 120 to send requests to first instance 120 that are consumable by first instance 120. For example, the information may be used to reconfigure a request for first target system 170 received by first instance 120 such that the reconfigured request is in a format consumable by first target system 170.

Figure 3:
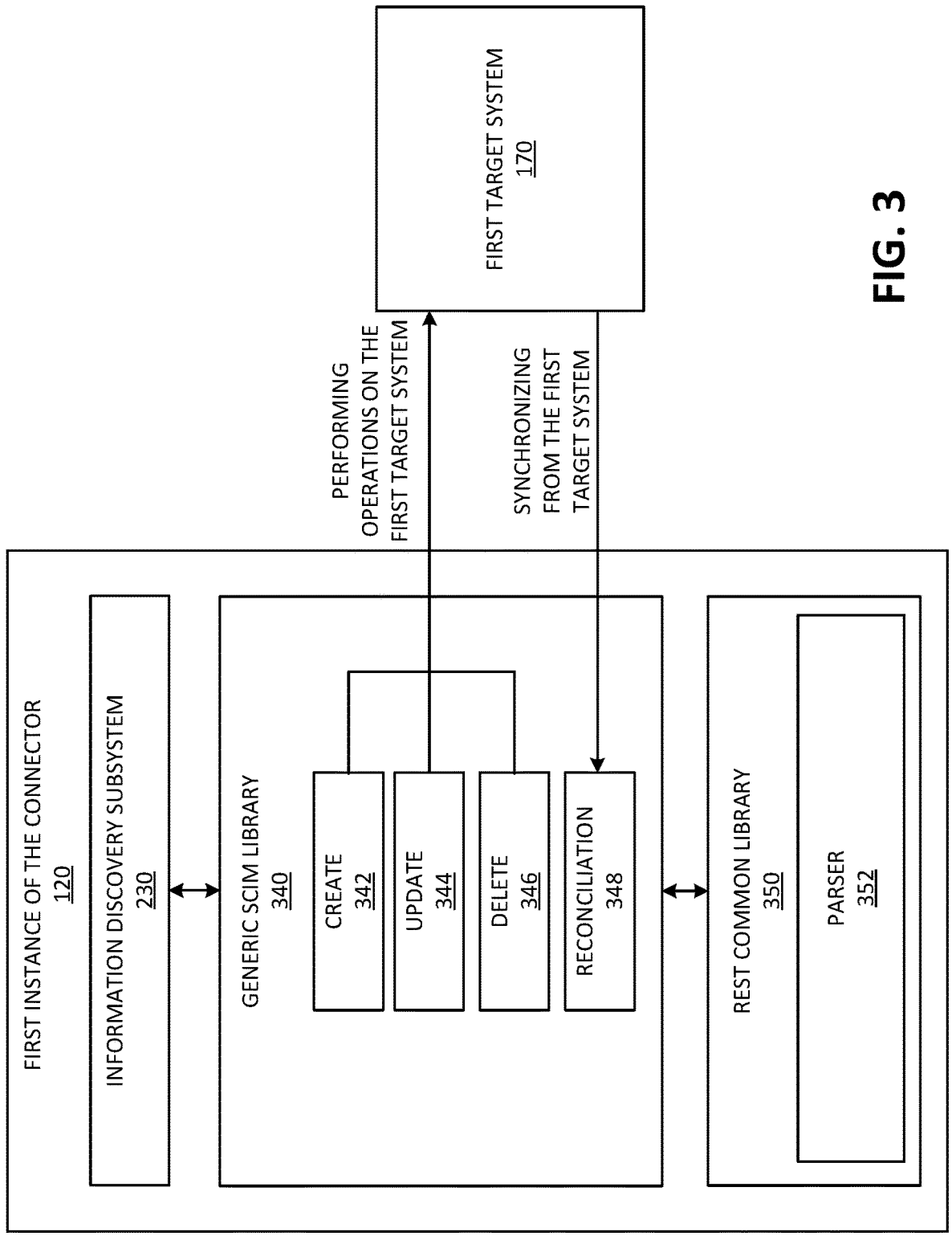
FIG. 3 illustrates an example of a system for processing requests.

FIG. 3 illustrates an example of a system for processing requests. The system may include first instance 120 and first target system 170 as described above. First instance 120 may include generic System for Cross-Domain Identity Management (SCIM) library 340 and REST common library 350.

REST common library 350 may include parser subsystem 352 to construct and/or deconstruct a payload of a request received by first instance 120. Parser subsystem 352 may support payload/response formats that are used for many target systems (e.g., JSON and XML). And as described above, REST common library may also include an authentication subsystem (e.g., authentication subsystem 122) (not illustrated).

Generic SCIM library 340 may be used to process operations identified from requests. Generic SCIM library 340 may include create subsystem 342, update subsystem 344, and delete subsystem 346. Depending on the operation received by first instance 120, a different subsystem of generic SCIM library 340 may process the request. For example, an operation to provision a new account may be processed by create subsystem 342. For another example, an operation to modify a current account may be processed by update subsystem 344. For another example, an operation to delete a current account may be processed by delete subsystem 346. In another example, an operation may be processed by multiple subsystems of generic SCIM library 340.

Each of the subsystems of generic SCIM library 340 described above may generate an additional request (or modify the request) that corresponds to the request received by first instance 120. For example, the additional request may be in a format consumable by first target system 170.

Generic SCIM library 340 may also include reconciliation subsystem 348. Reconciliation subsystem 348 may receive a request from first target system 170 to ensure that information on first target system 170 is consistent with information on first instance 120.

Figure 4:
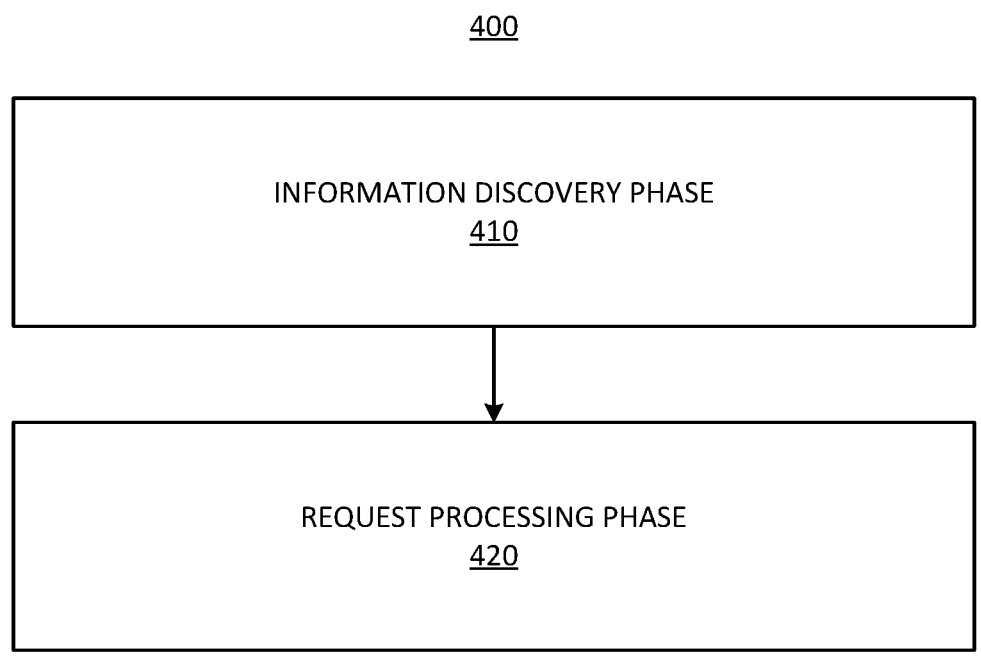
FIG. 4 is a simplified flowchart depicting phases performed by an instance of a connector.

FIG. 4 is a simplified flowchart depicting phases performed by an instance of a connector. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. The particular series of processing steps depicted in FIG. 4 is not intended to be limiting.

At 410, an information discovery phase is performed by the instance of the connector. The information discovery phase may discover information regarding a target system. In some embodiments, the information may be a schema for the target system. In such examples, the target system may include an application program interface (API) call for requesting the schema. Upon discovering the information, the instance of the connector may store the information in a schema data structure. The schema data structure may be used to interface with the target system.

At 420, a request processing phase is performed by the instance of the connector. The request processing phase may receive requests from client devices to perform operations on the target system. Using the information discovered in the information discovery phase, the instance of the connector may modify the requests from client devices or create new requests to send to the target system for processing. The modified requests and/or the new requests may be formatted such as to be consumable by the target system.

Figure 5:
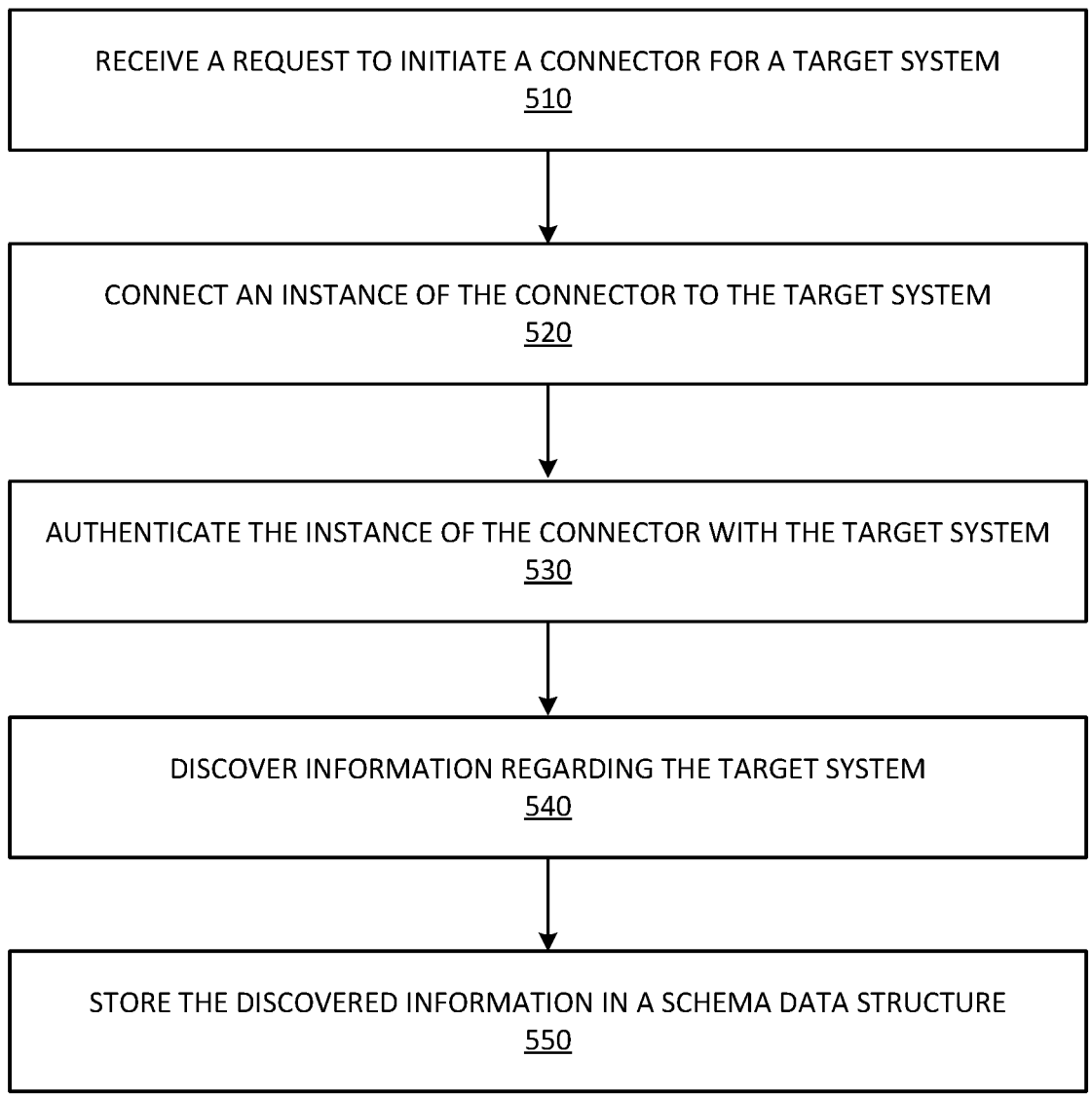
FIG. 5 is a simplified flowchart depicting processing performed during an information discovery phase.

FIG. 5 is a simplified flowchart depicting processing performed during an information discovery phase. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. The particular series of processing steps depicted in FIG. 5 is not intended to be limiting.

At 510, a request may be received by a management system. The request may be associated with initiating a connector for a target system. For example, the request may be from a device requesting that the management system be available to perform operations on the target system. For another example, the request may be from a user device requesting one or more operations be performed on one or more target systems. In response to the request, the management system may initiate an instance of the connector.

At 520, the instance of the connector may connect to the target system. Connecting to the target system may include the instance of the connector identifying an address (e.g., a universal resource locator (URL)) for the target system and navigating to the address. At 530, the instance of the connector may authenticate itself with the target system. Authentication may be performed by any authentication process supported by SCIM, as described above for FIG. 1.

At 540, the instance of the connector may discover information regarding the target system, as described above for FIG. 2. The information may be discovered from the target system. In some embodiments, the information may include one or more schema for the target system. A schema may define a structure (sometimes referred to as an organization) of the target system.

At 550, the instance of the connector may process and/or store the discovered information in a schema data structure. As described above for FIG. 2, the schema data structure may include object names, group names, parameters for the object names, parameters for the group names, relations between objects and/or group, or the like. However, it should be recognized that the discovered information and/or the schema data structure may not be stored in the instance, but rather in a location (e.g., with or remote from the management system) accessible by the instance.

Figure 6:
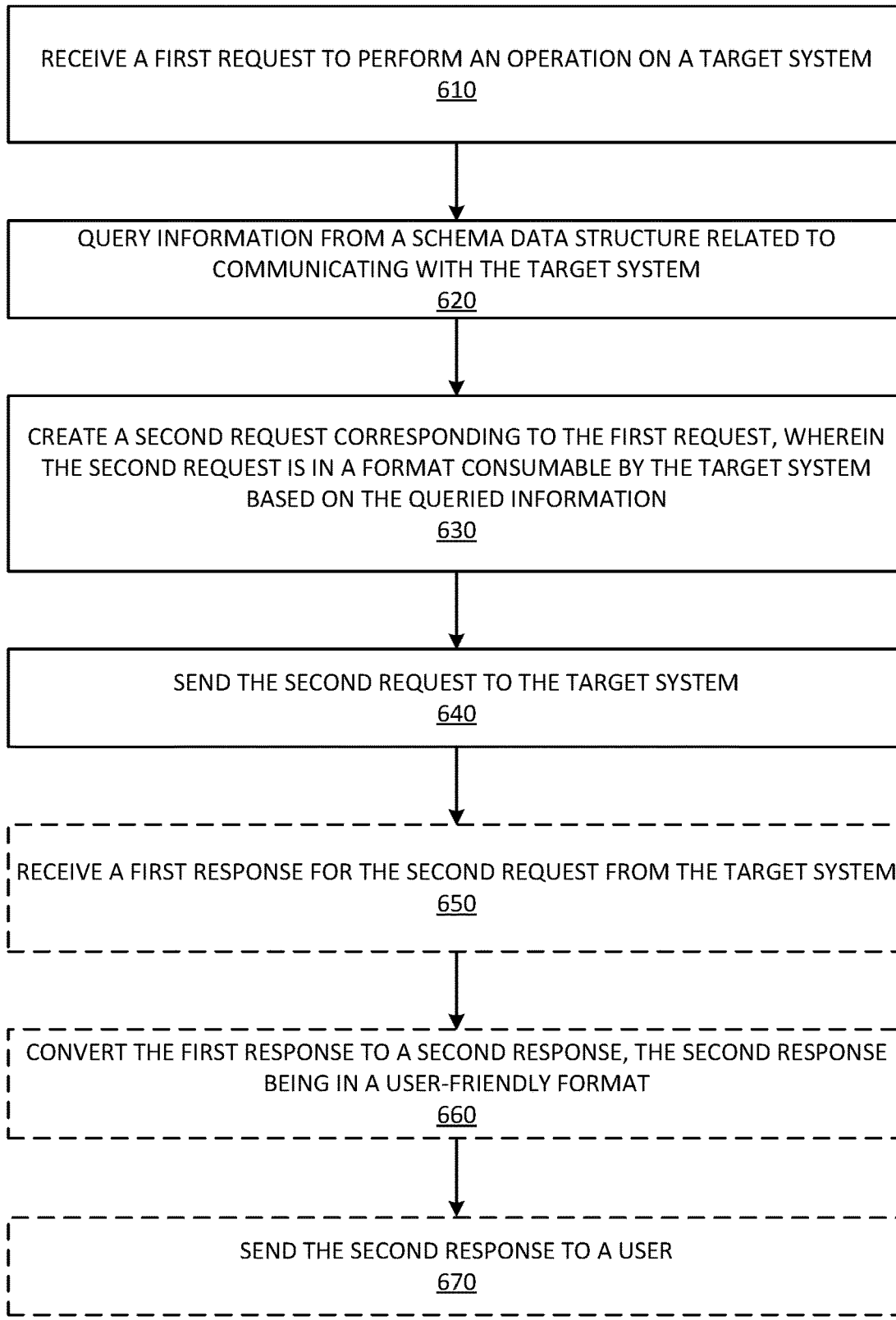
FIG. 6 is a simplified flowchart depicting processing performed during a request processing phase.

FIG. 6 is a simplified flowchart depicting processing performed during a request processing phase. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. The particular series of processing steps depicted in FIG. 6 is not intended to be limiting.

At 610, a first request may be received to perform an operation on a target system. The first request may be received by an instance of a connector that corresponds to the target system and/or the operation. The first request may be in a format that is not consumable by the target system.

At 620, information may be obtained by the instance of the connector. The information may be obtained by querying the information from a schema data structure that is: (1) associated with the target system and (2) stored by the instance of the connector. The schema data structure may be related to communicating with the target system. For example, the obtained information may include a schema for the target system. The schema may indicate a structure of the target system such that the schema may be used to interface with the target system.

At 630, a second request may be created by the instance of the connector based on the obtained information, the second request corresponding to the first request. The second request may be in a format consumable by the target system. The second request may be a different format than the first request. It should be recognized that the second request may be associated with one or more operations, each operation to be performed by the target system.

At 640, the second request may be sent to the target system by the instance of the connector. In response to receiving the second request, the target system may process the second request to perform the operation associated with the second request.

At 650, depending on the operation associated with the second request, a first response for the second request may be received from the target system by the instance of the connector. At 660, the first response may be converted (sometimes referred to as processed or formatted) to a user-friendly format (i.e., a second response). At 670, the second response may be forwarded to a user that sent the first request to the management system.

While FIG. 6 describes a request for a single operation, it should be recognized that a request may be for multiple operations. When the request is for multiple operations, a set of one or more of the multiple operations may correspond to a particular instance of the connector. For example, a first instance of the connector may correspond to creating accounts on the target system, and a second instance of the connector may correspond to modifying and deleting accounts on the target system. In such embodiments, the management system may send the first request to the first instance and the second instance, or the management system may send a modified first request to each of the first instance and the second instance such that each instance receives the operation associated with the instance.

While FIG. 6 describes a request for a single target system, it should be recognized that a request may be for multiple target systems. When the request is for multiple target systems, a set of one or more of the multiple target system may correspond to a particular instance of the connector. For example, a first instance of the connector may correspond to a first target system, and a second instance of the connector may correspond to a second target system. In such embodiments, the management system may send the first request to the first instance and the second instance, or the management system may send a modified first request to each of the first instance and the second instance such that each instance receives the operation associated with the instance.

Embodiments described above relate to situations where components do not need to be customized for a particular target system. For example, components may use generic authentication or parsing components for a target system. In such an example, the different instances of the connector need only acquire a schema for the target system in order to perform operations using the target system. However, in some embodiments, a particular target system may require customized components (e.g., authentication or parsing). Accordingly, embodiments described below handle these customizations.

Figure 7:
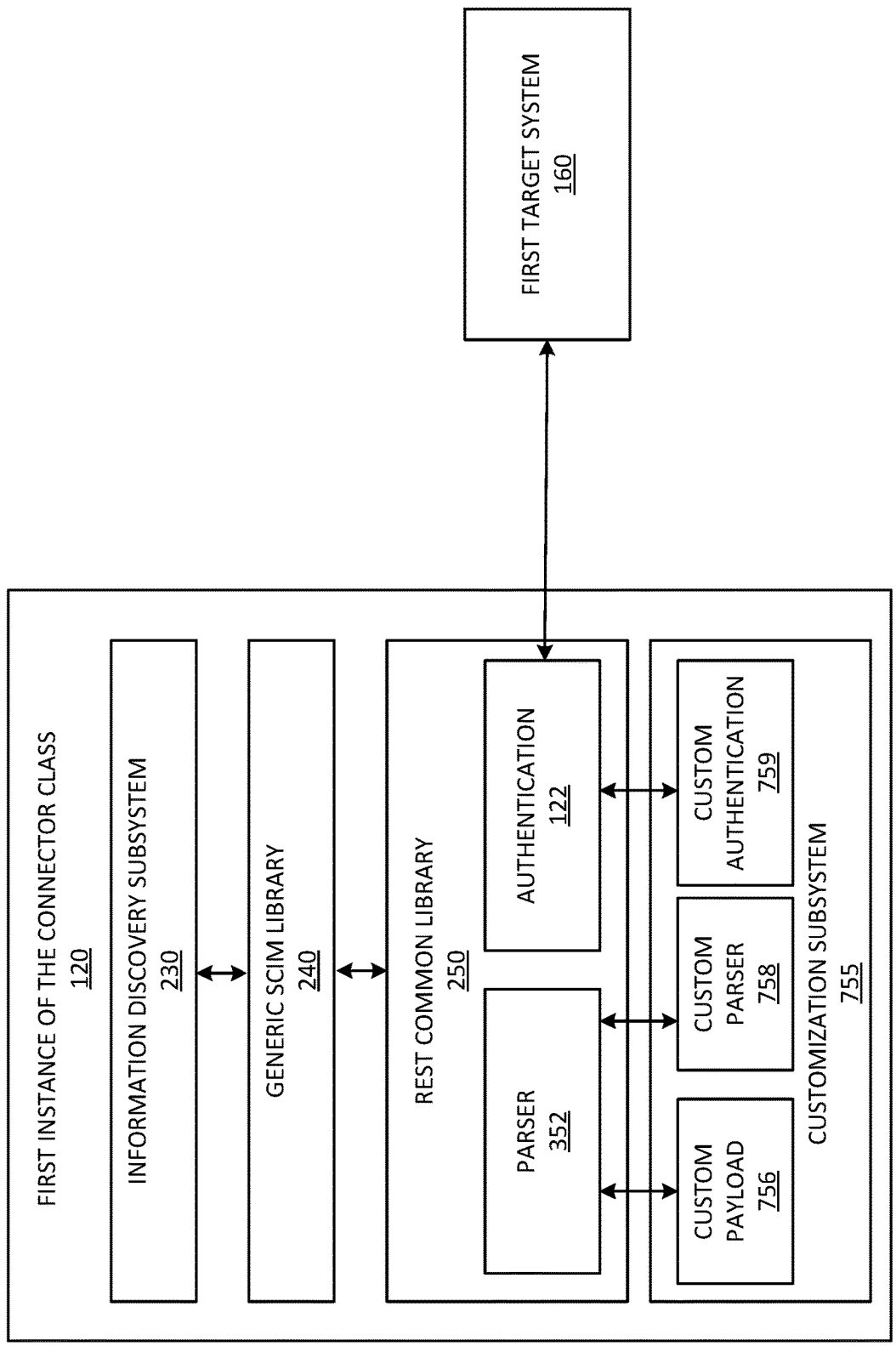
FIG. 7 illustrates an example a first instance of a connector with a customization subsystem.

FIG. 7 illustrates an example of first instance 120 with customization subsystem 755. Customization subsystem 755 may communicate with components of REST common library 250 described above. For example, customization subsystem 755 may communicate with parser subsystem 352 or authentication subsystem 122). For communicating with the components of REST common library 250, customization subsystem 755 may include custom payload subsystem 756 (supplementing parser subsystem 352), custom parser subsystem 758 (supplementing parser subsystem 352), custom authentication subsystem 759 (supplementing authentication subsystem 122), the like, or any combination thereof.

Custom payload subsystem 756 may be used to convert a first request received by first instance 120 into a second request consumable by first target system 170. For example, custom payload subsystem 756 may allow a payload of a second request to not be SCIM-compliant. Instead of SCIM-compliant, the payload may be a custom format that is consumable by first target system 170.

In one illustrative example, a first request to add a user to an existing group associated with first target system 170 may be received. The SCIM-compliant end point may be: https://host:port/group/{groupId}. The SCIM-compliant payload may be:

```
{
    userId: "12345"
}
```

However, first target system 170 may deviate from SCIM-compliant for the add operation while other operations are SCIM compliant. For example, the non-SCIM-compliant endpoint may be: https://host:port/group. The non-SCIM-compliant payload may be:

```
{
    user:{
        "id":"12345"
    },
    group:{
        "id":"456"
    }
}
```

Accordingly, the custom payload of the second request for adding a user may be defined as:

```
{
    "user":{
        "id":"<_UID_>"
    },
    "group":{
        "id":"<id>"
    }
}
```

While custom payload subsystem 756 may be used for minor deviations in standards for specific operations (e.g., one operation or less than half of the total number of operations), custom parser subsystem 758 may be used for supporting many deviations (e.g., multiple or all operations). For example, custom parser subsystem 758 may be used when there is a different data format altogether. Custom parser 758 may include logic for performing all operations associated with first target system 170.

In one illustrative example, a request may be to update a given name in an account associated with first target system 170 to "John." Two potential examples of the request are provided below. The difference between the first example and the second example is the target system. In the first example, the target system (i.e., Fusion Apps Identity Service) is based on SCIM Version 1. In the second example, the target system (i.e., Identity Cloud Service) is based on SCIM Version 17. Because both of these targets are adhering to different versions of SCIM, a payload sent to the respective target systems will need to be different. This would require a different integration or piece of code to perform the same operation for each target system. However, embodiments described herein accommodate different versions by internally generating different payloads for different target systems. In particular, a request may be generated for a target system by generic SCIM library 240 based on a configuration parameter for an appropriate SCIM version. The first example is the following:

```
Target: Fusion Apps Identity Service
Operation: PATCH
Endpoint: /Users/<UserID>
Payload:
    {
        "schemas": [
            ...
            "urn:scim:schemas:core:2.0:User"
        ]
        "name": {
            "givenName": "John"
        }
    }
```

The second example is the following:

```
Target: Identity Cloud Service
Operation: PATCH
Endpoint: /Users/<UserID>
Payload:
    {
        "schemas": [
            ...
            "urn:ietf:params:scim:api"messages:2.0:PatchOP"
        ]
            "Operations": [
                {
                    "op": "replace"
                    "path": "name.givenName",
                    "value": "John"
                }
            ]
    }
```

For another example, the SCIM standards support a JavaScript Object Notation (JSON) data format for payload and response. To integrate with the first target system 170, if the first target uses a different format than the JSON data format, custom parser subsystem 758 may be used. To use the custom parser subsystem 758, custom data parsing logic may be defined by implementing a parsing interface. The signature of the parsing interface may be:

```
public interface Parser {
    public String parseRequest (Map attributes, Map configurations);
    public List parseResponse (String response, Map configurations);
}
```

To implement the parsing interface, all methods of the parsing interface may be implemented. For example, the method "parseRequest (attributes, configurations)" needs to be implemented for parsing an input attribute Map and generating a String payload that is understandable by the first target system 170. The method "parseResponse (response, configurations)" needs to be implemented for parsing a string response received from the first target system 170 and forming a corresponding List of Maps, which may be consumed by the generic SCIM library 240.

In one illustrative example, a target system that an instance of a connector is integrated with has 4 fields for a user (i.e., firstName, lastName, profileId and staffGroupId). If the target system was JSON compliant, a response returned by the target system may have a format such as:

```
{
"schemas":["urn:ietf:params:scim:api:messages:2.0:ListResponse"],
"totalResults":2,
"Resources":[
    {
        "id":"2819c223-7f76-453a-919d-413861904646",
        "meta":{
            "resourceType":"User",
            "created":"2011-08-01T18:29:49.793Z",
            "lastModified":"2011-08-01T18:29:49.793Z"
        },
        "firstName":"john",
        "lastName":"smith",
        "profileId":"2569",
        "staffGroupId":"5986"
    },
    {
        "id":"c75ad752-64ae-4823-840d-ffa80929976c",
        "meta":{
            "resourceType":"User",
            "created":"2011-08-01T18:29:49.793Z",
            "lastModified":"2011-08-01T18:29:49.793Z"
        },
        "firstName":"peter",
        "lastName":"cech",
        "profileId":"7896",
        "staffGroupId":"3659"
    }
]
}
```

However, when the target system is not JSON compliant, a response returned by the target system may have a format such as:

```
{
    "items": [{
        "columnNames": [
            firstName,
            lastName,
            profileId,
            staffGroupId
        ]
    },
    {
        "rows": [{
            john,
            smith,
            123,
            88998
        },
        {
            peter,
            cech,
            45678,
            7767
        },
        ]
    }
    ]
}
```

To integrate with the target system with such a format, a custom parser may be implemented to parse data in the request into a format understandable by the instance of the connector.

A structure of the custom parser subsystem 758 may be:

```
public List parseResponse(String response, Map configurations)
{
    Map<String, Object> resultMap;
    //resultmap will contain the whole user search results
    columnNameList = (List<String>)
    resultMap.get(RightNowParserConstants.COLOUMN_NAMES);
```

-continued

```
userList = (List<List<String>>)
resultMap.get(RightNowParserConstants.ROW);
ListIterator<List<String>> userIterator = userList.listIterator( );
while (userIterator.hasNext( )) {
    //for each entry in the user list, do the following
    Map<String, Object>jsonResultMap = new HashMap<String,
    Object>( );
    for (int i = 0; i < columnNameList.size( ); i++) {
        // add each coloumn name and its value to the final map
        jsonResultMap.put(columnNameList.get(i),
        userValues.get(i));
        if(coloumName.isComplex) {
            //handling for complex attribute
        }
    }
}
    responsesList.add(jsonResultMap);
}
return responsesList;
```

Custom authentication subsystem 759 may allow an instance of a connector to authenticate itself with first target system 170 using an authentication that is particular to first target system 170. For example, the authentication may be custom or otherwise different than a standard authentication used by typical target systems.

In one illustrative example, a standard authentication, such as OAuth2.0, may require a particular format to authenticate with first target system 170. The particular format may include a client id and a client secret in a request body. However, first target system 170 may have a different format than the particular format. For example, the client id and the client secret may need to be in base64 encoded format in the request header, not as plain text in the request body as stated by OAuth2.0. Accordingly, custom authentication subsystem 759 may allow this different to be supported. An example of a customization for performing this authentication may be:

```
public class CustomAuth implements AuthenticationPlugin {
/*
 * This method returns the auth headers containing the access token, which will be used by the
connector for performing each operation
 */
@Override
public Map<String, String> getAuthHeaders(Map<String, Object> authParams) {
    Map<String, String> authHeaders = new HashMap<>( );
    // Set clientid and client secret (base64 encoded) in the request header as required by the
target
    // But, according to the standard it should be sent as clear text in the request body
    setCustomAuthHeaders(headers.put("AUTHORIZATION",BASIC +
Base64.getEncoder( ).encodeToString((client_id +":" +
client_secret).getBytes(StandardCharsets.UTF_8)));
    // Do a POST on token endpoint to get the access token
    jsonResp = executeRequest(this.authenticationServerUrl, POST);
    //Parse the response to get the access token
    JSONParser parser = new JSONParser( );
    Map<String, Object> jsonResponseMap = parser.convertJsonToMap(jsonResp);
    String accessToken = (String) jsonResponseMap.get("token");
    authHeaders.put(HttpHeaders.AUTHORIZATION, "BEARER"+ accessToken);
    //Return access token
    return authHeaders;
    }
}
```

Additional customizations that embodiments describes herein may support include Relative URI customization and HTTP Operation Type customization. Relative URI customization may be used when URIs deviate from the standard. In such cases, relative URIs per each operation and/or object may be configured. For example, password update of a user may need to be performed at /Users end-point for a generic target system. However, /UserPasswordChanger may need to be used instead of /Users for a particular target system. This difference may be supported by configuring a relURI parameter with the following: User.Password.Update=/UserPasswordChanger/<userid>.

HTTP Operation Type customization may be used when there is a deviation in the standard HTTP Operation that needs to be used for a request. For example, a generic target system may require that a POST operation be used for creating a resource. However, a particular target system may require a PUT instead of a POST. This difference may be supported by configuring an opType parameter with the following: User.Create=PUT.

Figure 8:
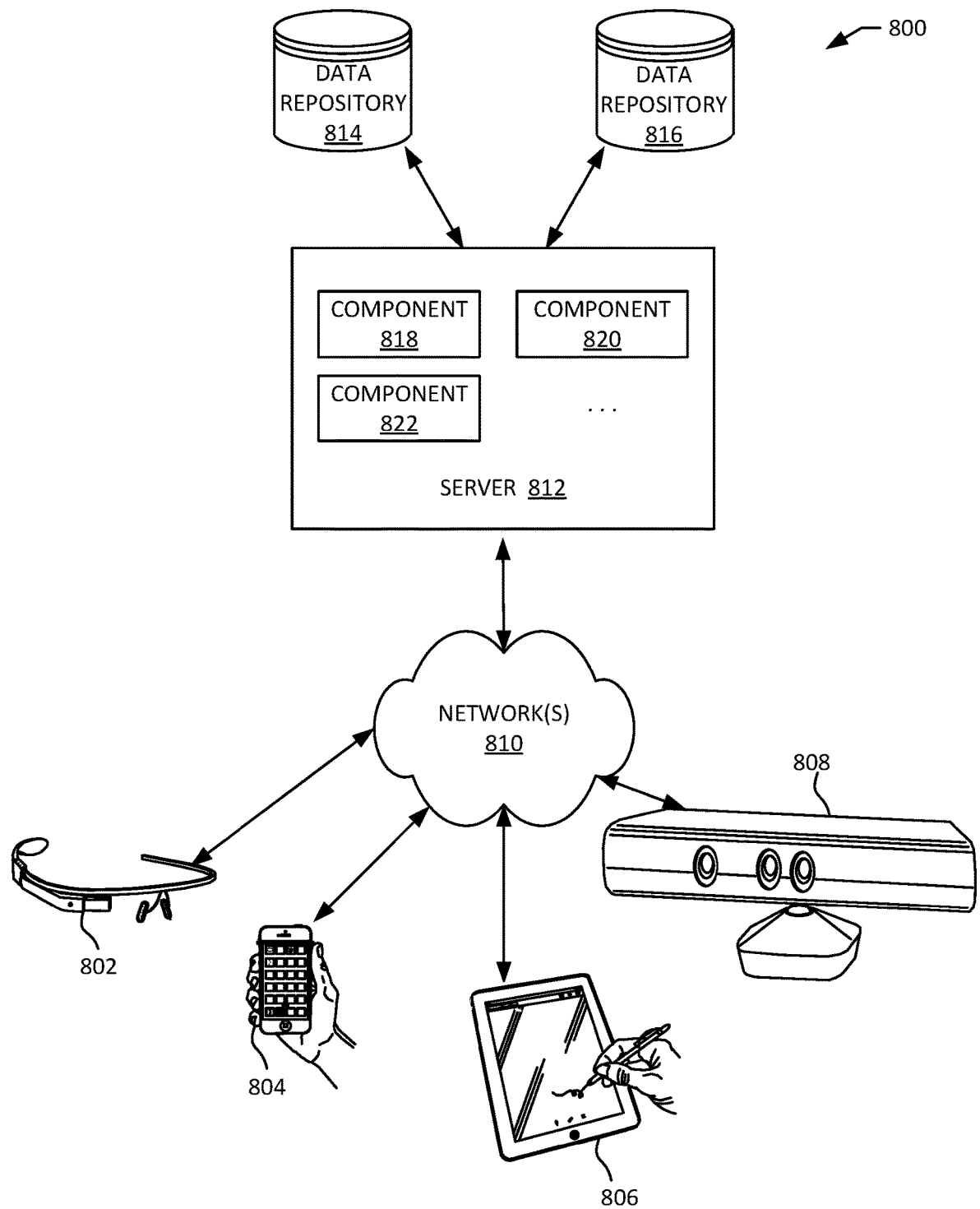
FIG. 8 illustrates another example of a distributed environment.

FIG. 8 depicts a simplified diagram of distributed system 800. In the illustrated example, distributed system 800 includes client computing devices 802, 804, 806, and 808, coupled to server 812 via one or more communication networks 810. Client computing devices 802, 804, 806, and 808 may be configured to execute one or more applications.

In certain embodiments, server 812 may provide services or software applications described herein that may include non-virtual and virtual environments. In some embodiments, these services may be offered as web-based or cloud services, such as under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, server 812 includes components 818, 820 and 822 that implement the functions performed by server 812. These components may include software components that may be executed by one or more processors, hardware components, or combinations thereof. It should be appreciated that various different system configurations are possible, which may be different from distributed system 800. The example shown in FIG. 8 is thus one example of a distributed system for implementing an example system and is not intended to be limiting.

Users may use client computing devices 802, 804, 806, and/or 808 to execute one or more applications, which may generate one or more requests that may then be serviced in accordance with the teachings of this disclosure. A client device may provide an interface that enables a user of the client device to interact with the client device. The client device may also output information to the user via this interface. Although FIG. 8 depicts four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 810 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 810 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 may include one or more virtual machines running virtual operating systems, or other computing architectures involving virtualization such as one or more flexible pools of logical storage devices that may be virtualized to maintain virtual storage devices for the server. In various examples, server 812 may be adapted to run one or more services or software applications that provide the functionality described in the foregoing disclosure.

The computing systems in server 812 may run one or more operating systems including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more data repositories 814, 816. These data repositories may be used to store data and other information. For example, one or more of the data repositories 814, 816 may be used to store information associated with the disclosure herein. Data repositories 814, 816 may reside in a variety of locations. For example, a data repository used by server 812 may be local to server 812 or may be remote from server 812 and in communication with server 812 via a network-based or dedicated connection. Data repositories 814, 816 may be of different types. In certain embodiments, a data repository used by server 812 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 814, 816 may also be used by applications to store application data. The data repositories used by applications may be of different types such as, for example, a key-value store repository, an object store repository, or a general storage repository supported by a file system.

Figure 9:
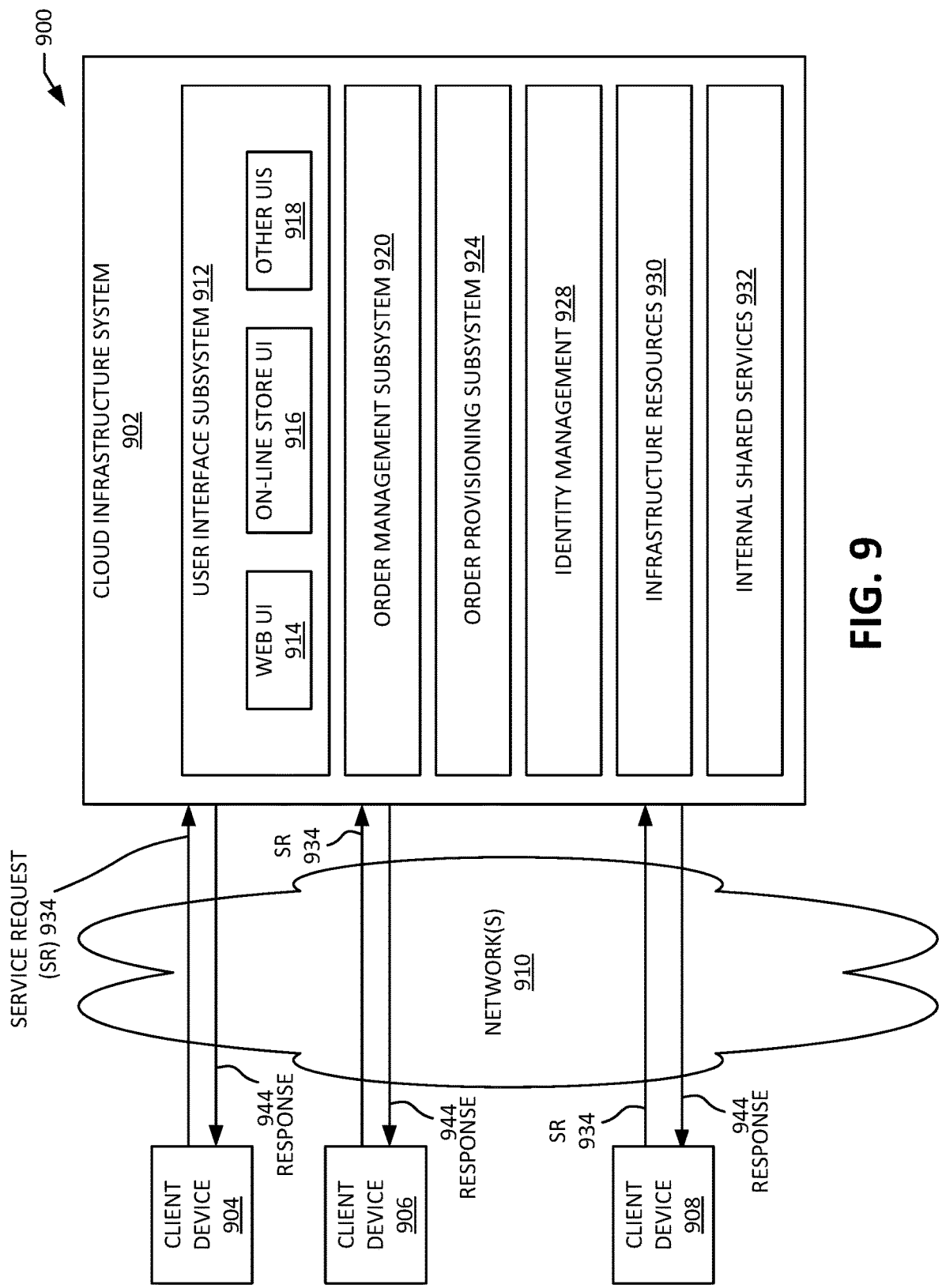
FIG. 9 is a simplified block diagram of a cloud-based system environment in which various authentication-related services may be offered as cloud services.

In certain embodiments, the functionalities described in this disclosure may be offered as services via a cloud environment. FIG. 9 is a simplified block diagram of a cloud-based system environment in which various services may be offered as cloud services, in accordance with certain examples. In the example depicted in FIG. 9, cloud infrastructure system 902 may provide one or more cloud services that may be requested by users using one or more client computing devices 904, 906, and 908. Cloud infrastructure system 902 may comprise one or more computers and/or servers that may include those described above for server 812. The computers in cloud infrastructure system 902 may be organized as general purpose computers, specialized server computers, server farms, server clusters, or any other appropriate arrangement and/or combination.

Network(s) 910 may facilitate communication and exchange of data between clients 904, 906, and 908 and cloud infrastructure system 902. Network(s) 910 may include one or more networks. The networks may be of the same or different types. Network(s) 910 may support one or more communication protocols, including wired and/or wireless protocols, for facilitating the communications.

The example depicted in FIG. 9 is only one example of a cloud infrastructure system and is not intended to be limiting. It should be appreciated that, in some other examples, cloud infrastructure system 902 may have more or fewer components than those depicted in FIG. 9, may combine two or more components, or may have a different configuration or arrangement of components. For example, although FIG. 9 depicts three client computing devices, any number of client computing devices may be supported in alternative examples.

The term cloud service is generally used to refer to a service that is made available to users on demand and via a communication network such as the Internet by systems (e.g., cloud infrastructure system 902) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 902 may provide one or more cloud services using different models such as under a Software as a Service (SaaS) model, a Platform as a Service (PaaS) model, an Infrastructure as a Service (IaaS) model, and others, including hybrid service models. Cloud infrastructure system 902 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 902. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 902. Cloud infrastructure system 902 then performs processing to provide the services requested in the customer's subscription order. For example, a user may request the cloud infrastructure system to register an application, as described above, and provide management services to the application per the application's specified management-related requirements. Cloud infrastructure system 902 may be configured to provide one or more cloud services.

Cloud infrastructure system 902 may provide the cloud services via different deployment models. In a public cloud model, cloud infrastructure system 902 may be owned by a third party cloud services provider and the cloud services are offered to any general public customer, where the customer may be an individual or an enterprise. Under a private cloud model, cloud infrastructure system 902 may be operated within an organization (e.g., within an enterprise organization) and services provided to customers that are within the organization. For example, the customers may be various departments of an enterprise such as the Human Resources department, the Payroll department, etc. or even individuals within the enterprise. Under a community cloud model, the cloud infrastructure system 902 and the services provided may be shared by several organizations in a related community. Various other models such as hybrids of the above mentioned models may also be used.

Client computing devices 904, 906, and 908 may be of different types (such as devices 802, 804, 806, and 808 depicted in FIG. 8) and may be capable of operating one or more client applications. A user may use a client device to interact with cloud infrastructure system 902, such as to request a service provided by cloud infrastructure system 902. For example, a user may use a client device to request a management-related service described in this disclosure.

In some embodiments, the processing performed by cloud infrastructure system 902 for providing management-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 902 for determining which storage virtual machine is to be selected for a particular application based upon the application's stated management-related requirements. The data used for this analysis may include structured data (e.g., data stored in a database or structured according to a structured model) and/or unstructured data (e.g., data blobs (binary large objects)).

As depicted in the example in FIG. 9, cloud infrastructure system 902 may include infrastructure resources 930 that are utilized for facilitating the provision of various cloud services offered by cloud infrastructure system 902. Infrastructure resources 930 may include, for example, processing resources, storage or memory resources, networking resources, and the like. In certain embodiments, the storage virtual machines that are available for servicing storage requested from applications may be part of cloud infrastructure system 902. In other embodiments, the storage virtual machines may be part of different systems.

In certain embodiments, to facilitate efficient provisioning of these resources for supporting the various cloud services provided by cloud infrastructure system 902 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 902 may itself internally use services 932 that are shared by different components of cloud infrastructure system 902 and which facilitate the provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 902 may comprise multiple subsystems. These subsystems may be implemented in software, or hardware, or combinations thereof. As depicted in FIG. 9, the subsystems may include a user interface subsystem 912 that enables users or customers of cloud infrastructure system 902 to interact with cloud infrastructure system 902. User interface subsystem 912 may include various different interfaces such as a web interface 914, an online store interface 916 where cloud services provided by cloud infrastructure system 902 are advertised and are purchasable by a consumer, and other interfaces 918. For example, a customer may, using a client device, request (service request 934) one or more services provided by cloud infrastructure system 902 using one or more of interfaces 914, 916, and 918. For example, a customer may access the online store, browse cloud services offered by cloud infrastructure system 902, and place a subscription order for one or more services offered by cloud infrastructure system 902 that the customer wishes to subscribe to. The service request may include information identifying the customer and one or more services that the customer desires to subscribe to. For example, a customer may place a subscription order for a management-related service offered by cloud infrastructure system 902. As part of the order, the customer may provide information identifying an application for which the service is to be provided and the one or more credentials for the application.

In certain embodiments, such as the example depicted in FIG. 9, cloud infrastructure system 902 may comprise an order management subsystem (OMS) 920 that is configured to process the new order. As part of this processing, OMS 920 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 920 may then invoke the order provisioning subsystem (OPS) 924 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 924 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain embodiments, setup phase processing, as described above, may be performed by cloud infrastructure system 902 as part of the provisioning process. Cloud infrastructure system 902 may generate an application ID and select a storage virtual machine for an application from among storage virtual machines provided by cloud infrastructure system 902 itself or from storage virtual machines provided by other systems other than cloud infrastructure system 902.

Cloud infrastructure system 902 may send a response or notification 944 to the requesting customer to indicate when the requested service is now ready for use. In some instances, information (e.g., a link) may be sent to the customer that enables the customer to start using and availing the benefits of the requested services. In certain embodiments, for a customer requesting the management-related service, the response may include an application ID generated by cloud infrastructure system 902 and information identifying a virtual machine selected by cloud infrastructure system 902 for an application corresponding to the application ID.

Cloud infrastructure system 902 may provide services to multiple customers. For each customer, cloud infrastructure system 902 is responsible for managing information related to one or more subscription orders received from the customer, maintaining customer data related to the orders, and providing the requested services to the customer. Cloud infrastructure system 902 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 902 may provide services to multiple customers in parallel. Cloud infrastructure system 902 may store information for these customers, including possibly proprietary information. In certain embodiments, cloud infrastructure system 902 comprises an identity management subsystem (IMS) 928 that is configured to manage customer information and provide the separation of the managed information such that information related to one customer is not accessible by another customer. IMS 928 may be configured to provide various security-related services such as identity services, such as information access management, authentication and authorization services, services for managing customer identities and roles and related capabilities, and the like.

Figure 10:
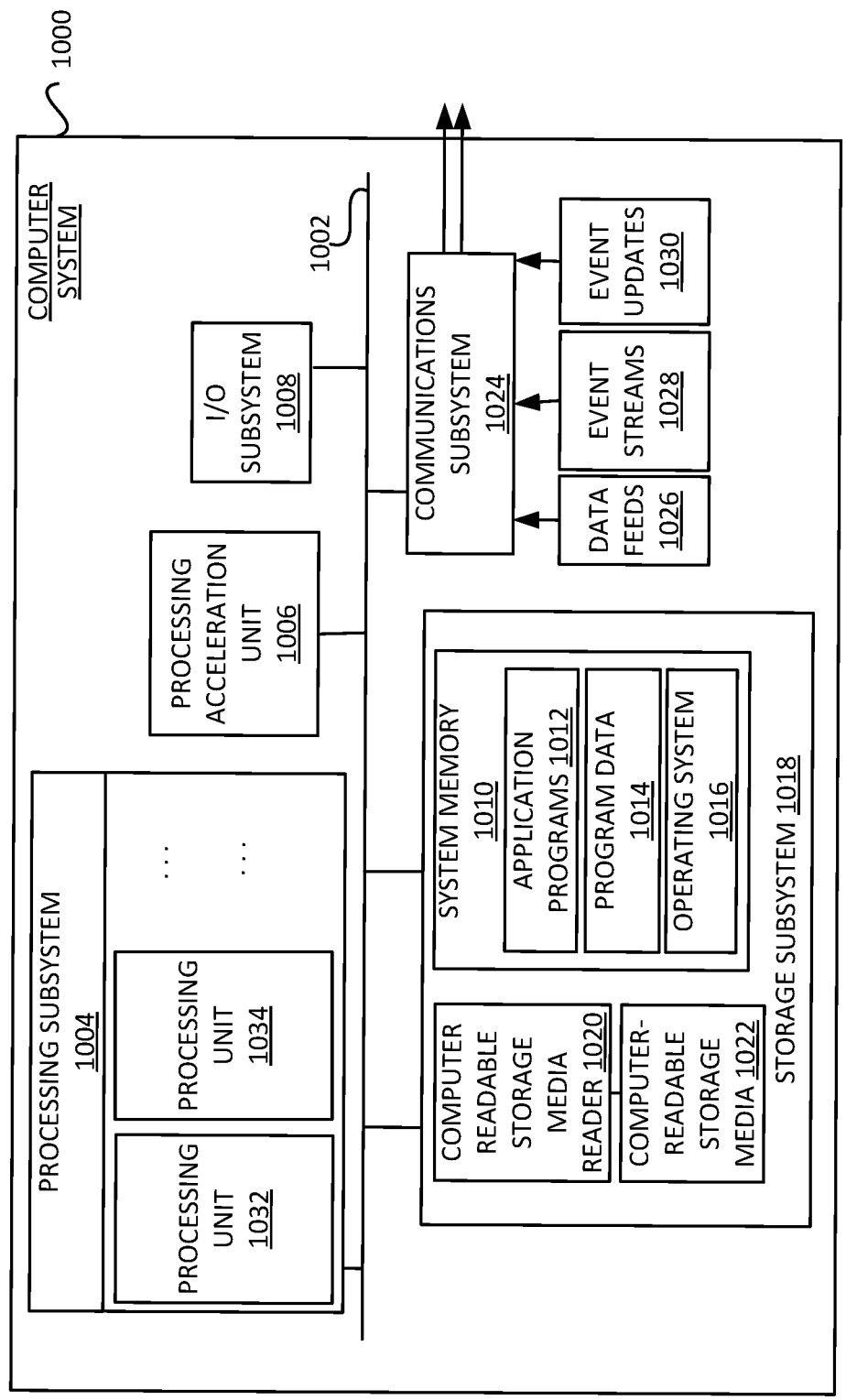
FIG. 10 illustrates an example of a computer system.

FIG. 10 illustrates an example of computer system 1000. In some embodiments, computer system 1000 may be used to implement any of the application system, management system, systems within a data center, and various servers and computer systems described above. As shown in FIG. 10, computer system 1000 includes various subsystems including a processing subsystem 1004 that communicates with a number of other subsystems via a bus subsystem 1002. These other subsystems may include processing acceleration unit 1006, I/O subsystem 1008, storage subsystem 1018, and communications subsystem 1024. Storage subsystem 1018 may include non-transitory computer-readable storage media including storage media 1022 and system memory 1010.

Bus subsystem 1002 provides a mechanism for letting the various components and subsystems of computer system 1000 communicate with each other as intended. Although bus subsystem 1002 is shown schematically as a single bus, alternative examples of the bus subsystem may utilize multiple buses. Bus subsystem 1002 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1004 controls the operation of computer system 1000 and may comprise one or more processors, application specific integrated circuits (ASICs), or field programmable gate arrays (FPGAs). The processors may include be single core or multicore processors. The processing resources of computer system 1000 may be organized into one or more processing units 1032, 1034, etc. A processing unit may include one or more processors, one or more cores from the same or different processors, a combination of cores and processors, or other combinations of cores and processors. In some embodiments, processing subsystem 1004 may include one or more special purpose co-processors such as graphics processors, digital signal processors (DSPs), or the like. In some embodiments, some or all of the processing units of processing subsystem 1004 may be implemented using customized circuits, such as application specific integrated circuits (ASICs), or field programmable gate arrays (FPGAs).

In some embodiments, the processing units in processing subsystem 1004 may execute instructions stored in system memory 1010 or on computer readable storage media 1022. In various examples, the processing units may execute a variety of programs or code instructions and may maintain multiple concurrently executing programs or processes. At any given time, some or all of the program code to be executed may be resident in system memory 1010 and/or on computer-readable storage media 1022 including potentially on one or more storage devices. Through suitable programming, processing subsystem 1004 may provide various functionalities described above. In instances where computer system 1000 is executing one or more virtual machines, one or more processing units may be allocated to each virtual machine.

In certain embodiments, a processing acceleration unit 1006 may optionally be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term input device is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1000 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information and data that is used by computer system 1000. Storage subsystem 1018 provides a tangible non-transitory computer-readable storage medium for storing the basic programming and data constructs that provide the functionality of some examples. Storage subsystem 1018 may store software (e.g., programs, code modules, instructions) that when executed by processing subsystem 1004 provides the functionality described above. The software may be executed by one or more processing units of processing subsystem 1004. Storage subsystem 1018 may also provide authentication in accordance with the teachings of this disclosure.

Storage subsystem 1018 may include one or more non-transitory memory devices, including volatile and non-volatile memory devices. As shown in FIG. 10, storage subsystem 1018 includes system memory 1010 and computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM), dynamic random access memory (DRAM), and the like.

By way of example, and not limitation, as depicted in FIG. 10, system memory 1010 may load application programs 1012 that are being executed, which may include various applications such as Web browsers, mid-tier applications, relational database management systems (RDBMS), etc., program data 1014, and operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1022 may store programming and data constructs that provide the functionality of some examples. Computer-readable media 1022 may provide storage of computer-readable instructions, data structures, program modules, and other data for computer system 1000. Software (programs, code modules, instructions) that, when executed by processing subsystem 1004 provides the functionality described above, may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1018 may also include computer-readable storage media reader 1020 that may further be connected to computer-readable storage media 1022. Reader 1020 may receive and be configured to read data from a memory device such as a disk, a flash drive, etc.

In certain embodiments, computer system 1000 may support virtualization technologies, including but not limited to virtualization of processing and memory resources. For example, computer system 1000 may provide support for executing one or more virtual machines. In certain embodiments, computer system 1000 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1000. Accordingly, multiple operating systems may potentially be run concurrently by computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. For example, when computer system 1000 is used to implement management system 150 depicted in FIG. 1, the communication subsystem may be used to communicate with an application system and also a system executing a storage virtual machine selected for an application.

Communication subsystem 1024 may support both wired and/or wireless communication protocols. In certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1024 may provide wired network connectivity (e.g., Ethernet) in addition to or instead of a wireless interface.

Communication subsystem 1024 may receive and transmit data in various forms. In some embodiments, in addition to other forms, communications subsystem 1024 may receive input communications in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end.

Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to communicate data from computer system 1000 to other computer systems or networks. The data may be communicated in various different forms such as structured and/or unstructured data feeds 1026, event streams 1028, event updates 1030, and the like to one or more databases that may be in communication with one or more streaming data source computers coupled to computer system 1000.

Computer system 1000 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
receiving, by a management system, a request to initiate a connector for each of a plurality of target systems, wherein each of the plurality of target systems are System for Cross Domain Identity Management (SCIM) compliant or a customization of SCIM;
for each of the plurality of target systems:
connecting, by an instance of the connector, to a target system, wherein each of the plurality of target systems has a different instance of the connector;
obtaining, by the instance of the connector, information regarding the target system; and
storing, by the instance of the connector, the obtained information;
receiving, by the management system, a first request to perform an operation on each of the plurality of target systems, wherein the operation is associated with modifying, creating, deleting or querying an account on the target system of the plurality of target systems;
for each of the plurality of target systems:
identifying, by the management system, a particular instance of the connector that corresponds to the target system;
creating, by the particular instance of the connector, a second request to perform the operation on the target system, wherein the second request corresponds to the first request, and wherein the second request is consumable by the target system based on the obtained information; and
sending, by the particular instance of the connector, the second request to the target system, wherein receipt of the second request by the target system causes the target system to perform the operation.

2. The method of claim 1, wherein the information regarding the target system is a schema of the target system.

3. The method of claim 2, wherein obtaining the information includes using:
a System for Cross Domain Identity Management (SCIM) application program interface (API); or
a customized System for Cross Domain Identity Management (SCIM) application program interface (API).

4. The method of claim 1, wherein the second request to a first target system of the plurality of target systems is in a different format than the second request to a second target system of the plurality of target systems.

5. The method of claim 1, wherein the request to initiate the connector for each of the plurality of target systems is the same request as the first request.

6. The method of claim 1, wherein the obtained information is stored in a schema data structure.

7. The method of claim 1, wherein a payload of the second request is not SCIM compliant.

8. The method of claim 7, wherein a payload of a request for a second operation associated with the target system is SCIM compliant.

9. The method of claim 1, further comprising:
for each of the plurality of target systems, authenticating the instance of the connector in response to the instance of the connector connecting to the target system.

10. The method of claim 9, wherein authenticating the instance is based on a custom authentication process associated with the target system.

11. The method of claim 1, wherein the second request is sent to a URI specified for the target system for the operation, wherein the URI is different than a URI specified for the operation by SCIM.

12. The method of claim 1, wherein the second request is sent using a HTTP Operation different than is specified by SCIM.

13. A non-transitory computer-readable storage medium storing a plurality of instructions executable by one or more processors, the plurality of instructions when executed by the one or more processors cause the one or more processors to perform processing comprising:
receiving, by a management system, a request to initiate a connector for each of a plurality of target systems, wherein each of the plurality of target systems are System for Cross Domain Identity Management (SCIM) compliant or a customization of SCIM;
for each of the plurality of target systems:
connecting, by an instance of the connector, to the target system, wherein each of the plurality of target systems has a different instance of the connector;
obtaining, by the instance of the connector, information regarding the target system; and
storing, by the instance of the connector, the obtained information;
receiving, by the management system, a first request to perform an operation on each of the plurality of target systems, wherein the operation is associated with modifying, creating, deleting or querying an account on a target system of the plurality of target systems;
for each of the plurality of target systems:
identifying, by the management system, a particular instance of the connector that corresponds to the target system;
creating, by the particular instance of the connector, a second request to perform the operation on the target system, wherein the second request corresponds to the first request, and wherein the second request is consumable by the target system based on the obtained information; and
sending, by the particular instance of the connector, the second request to the target system, wherein receipt of the second request by the target system causes the target system to perform the operation.

14. The non-transitory computer-readable storage medium of claim 13, wherein the information regarding the target system is a schema of the target system.

15. The non-transitory computer-readable storage medium of claim 14, wherein obtaining the information includes using:
a System for Cross Domain Identity Management (SCIM) application program interface (API); or
a customized System for Cross Domain Identity Management (SCIM) application program interface (API).

16. The non-transitory computer-readable storage medium of claim 13, wherein the second request to a first target system of the plurality of target systems is in a different format than the second request to a second target system of the plurality of target systems.

17. A system comprising:
one or more processors; and
a non-transitory computer-readable medium including instructions that, when executed by the one or more processors, cause the one or more processors to:
receive a request to initiate a connector for each of a plurality of target systems, wherein each of the plurality of target systems are System for Cross Domain Identity Management (SCIM) compliant or a customization of SCIM;

for each of the plurality of target systems:
   connect, by an instance of the connector, to the target system, wherein each of the plurality of target systems has a different instance of the connector;
   obtain, by the instance of the connector, information regarding the target system; and
   store, by the instance of the connector the obtained information;
receive a first request to perform an operation on each of the plurality of target systems, wherein the operation is associated with modifying, creating, deleting or querying an account on a target system of the plurality of target systems;
for each of the plurality of target systems:
   identify a particular instance of the connector that corresponds to the target system;
   create, by the particular instance of the connector, a second request to perform the operation on the target system, wherein the second request corresponds to the first request, and wherein the second request is consumable by the target system based on the obtained information; and
   send, by the particular instance of the connector, the second request to the target system, wherein receipt of the second request by the target system causes the target system to perform the operation.

* * * * *